June 17, 1969  E. M. KRALOVEC, JR  3,450,862
CONTROL OF ELECTRIC HEAT
Filed Dec. 2, 1965

INVENTOR
Edward M. Kralovec, Jr.
BY Merriam, Marshall, Shapiro & Klose
ATTORNEYS

United States Patent Office 3,450,862
Patented June 17, 1969

3,450,862
CONTROL OF ELECTRIC HEAT
Edward M. Kralovec, Jr., 6767 N. Wildwood,
Chicago, Ill. 60646
Filed Dec. 2, 1965, Ser. No. 511,199
Int. Cl. H05b 1/02; G05d 23/20
U.S. Cl. 219—494                                    4 Claims

ABSTRACT OF THE DISCLOSURE

An electric heating system for proportionately varying the output heat to enclosures including an indoor heat sensing element mounted immediately adjacent an electric resistance heating element for directly sensing the actual output heat. Outdoor sensing means including a temperature sensing element and solar radiation sensors respond to changes in the outdoor environment to unbalance the heating system and proportionately vary the output heat from the heating element. The heat sensing element directly senses changes in the resultant output heat and controls the output heat until a balanced condition is obtained. Heating and ventilating air is supplied to the enclosure to set the final temperature under control of an indoor thermostat which senses the actual temperature in the enclosure.

---

This invention relates in general to the control of electric heating elements and more particularly to a system for controlling the amount of heat output of the heating elements in proportion to heating requirements.

The present invention is readily adapted to buildings or enclosures employing electric resistance heating where it is desired to modulate or proportion the amount of power to the heating element to provide the proper amount of heat to an area under various conditions. A proportionate change in the amount of heat supplied is necessary to correctly compensate for the increase or decrease of building heating loss due to changes in outdoor temperatures and the particular climatic environment of the space to be heated.

In accordance with this invention, it has been found that the input power to electric resistance heating elements can be properly set and maintained to control the amount of output heat desired. Changes in the outdoor temperature and/or environmental conditions are compensated by adjusting the set level at which the heat output of the heating elements is maintained.

Figure 1:
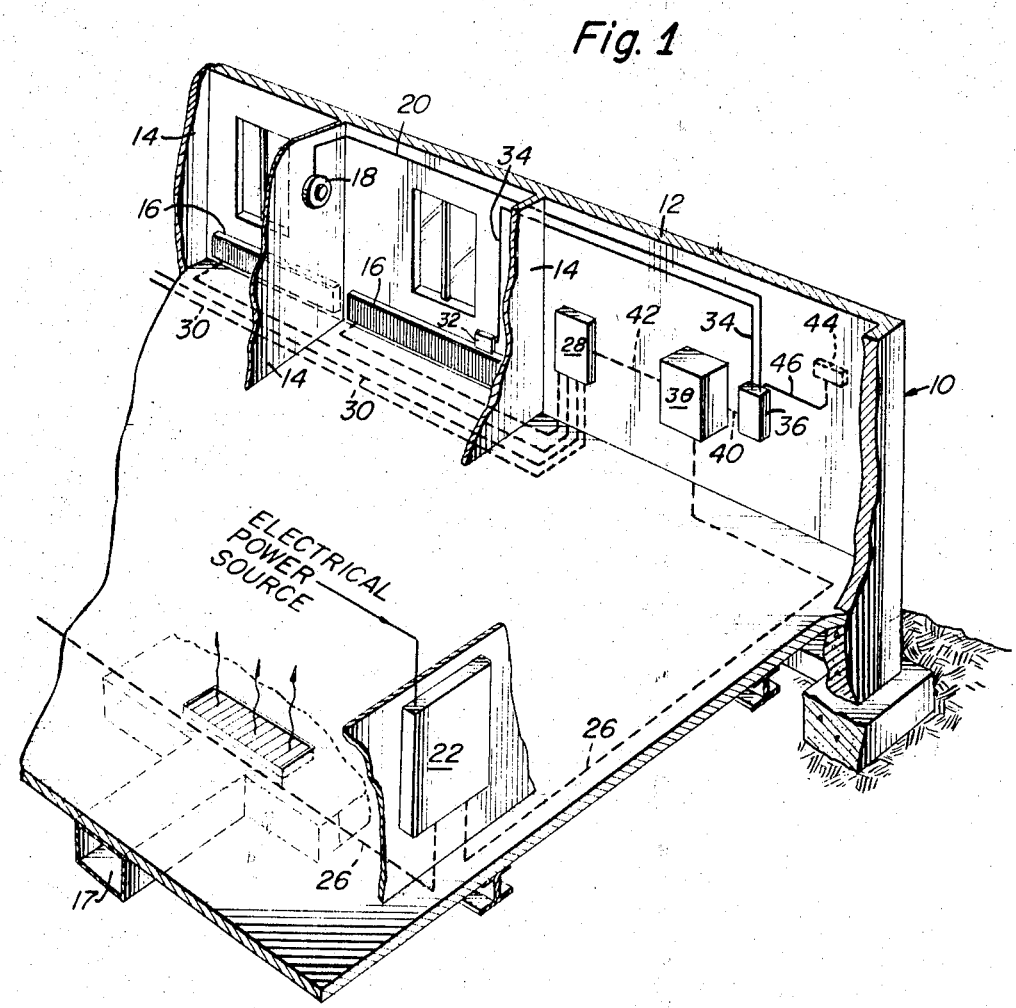

In the drawing, FIGURE 1 is a diagrammatic view illustrating an electric heating system wherein the heating elements are controlled according to the principles of the present invention.

Figure 2:
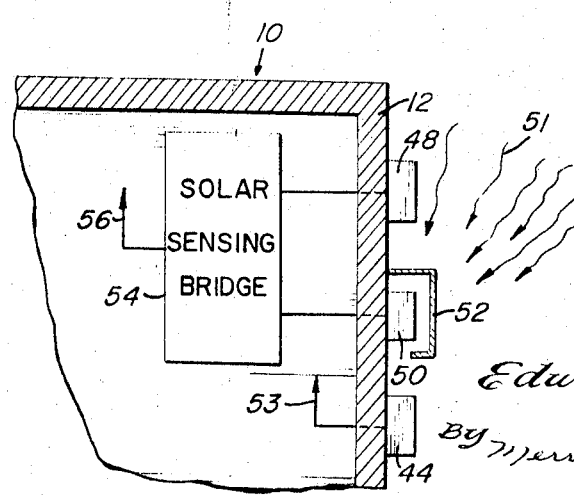

FIGURE 2 is a diagrammatic fragmentary view illustrating an arrangement for compensating control of the heating elements according to changes in environmental conditions according to the principles of the present invention.

The present invention contemplates a system for controlling the output heat of electric resistance heating elements in accordance with changes in the environmental conditions affecting the heated area.

In another aspect of the invention a heat sensing element is located adjacent to one of the heating elements to set and maintain the output heat of the heating system at a desired level by operating a controller which regulates the input voltage to the heating elements. An increase or decrease in the element input voltage provides a corresponding percentage change in output heat. According to this aspect of the invention, a temperature sensing element located outside of the heated area senses the outside air temperature and operates the controller to change the heating element input voltage, with the indoor sensing element adjusting to form a new set level in the controller corresponding to the system heat output now required in view of the changed outside temperature. In a more specific aspect compensation for solar effects is also introduced into the controller to correspondingly adjust the output heat. In a still further aspect of the invention, the heat sensing element can be eliminated, so that direct changes in the voltage supplied to the heating element (instead of percentage changes in output heat as previously indicated) will result with variations in the outdoor temperature.

Referring now to FIGURE 1, there is shown a building 10 which is heated by electric resistance elements having a heat output which is controlled in accordance with the principles of the present invention. Only a single wall 12 of the building 10 has been illustrated and it is to be understood that the remaining walls of the building also include heating elements controlled in the manner to be herein described. The outside wall 12 is shown as being divided by a number of inside partition walls 14 with an electric resistance type heating element 16 or several such elements intermediate to each of the partition walls 14.

The heating elements 16 are of the well known type utilized in electric heating systems. In most instances a supply of air is furnished to the room or enclosure through appropriate ducts 17 and blowers to provide for efficient convection heating and ventilating of the building 10. A thermostat 18 is utilized to set the desired temperature limits within the area to be heated and by means of a lead 20 the thermostat 18 can control for instance the temperature output of a suitable air supply system to maintain the final temperature of the room or enclosure.

A main distribution panel 22 couples a source of electrical power via a number of branch supply lines 26, zone distribution panels 28 and individual element supply lines 30 to the desired heating elements 16. The building 10 is divided into a number of heating zones with each of the branch supply lines 26 supplying the necessary electrical power to an appropriate zone distribution panel 28 located in each of the zones. The distribution panels 22 and 28 are of the well known type used for this purpose and include the usual terminal points and fused line connectors.

Within each of the heating zones a heat sensing element 32 is mounted immediately adjacent one of the heating elements 16 so as to directly sense the output heat radiating from the particular heating element. The heat sensing element 32 is coupled by a lead 34 to a bridge and amplifier assembly in a proportional controller 36. The controller 36 includes a balanced bridge circuit coupled to a proportional amplifier in a well known configuration.

The heat sensing element 32 is a variable resistance device which senses a change in output heat from the heating elements 16 and transforms this into a change in resistance. The resistance element 32 is electrically connected by the lead 34 to one leg of the null balance Wheatstone bridge circuit in the controller 36. Thus changes in heat output from the heating elements 16 change the resistance of the heat sensing elements 32 and thereby create an error signal by unbalancing the bridge circuit in the controller 36.

The error signal output of the bridge circuit is amplified by the proportional amplifier in the controller 36 to drive a variable power controller 38 through an output connection 40. The power controller 38 is effectively coupled intermediate the branch supply line 26 and the individual supply line 30. The power controller 38 receives the error signal from the proportional controller 36 and through a cable 42 supplies the corrected input power to the zone distribution panel 28 and thereby to the individual heating elements 16. As an example, circuits employing magnetic amplifier-controlled silicon controlled rectifiers which provide a variation in output voltage in response to input error signals can be utilized to perform the operations of the power controller 38. Such devices are readily available and are in general use.

In operation, the proportional controller 36 is initially set up so that the included bridge circuit will be balanced and there will be no error signal output from the bridge to the coupled proportional amplifier for a desired level of heat output from the heating elements 16. The heat sensing element 32 senses the amount of heat output from one of the heating elements 16 and maintains the heat output at the desired preset level through the variable power controller 38. Due to the fact that changes in outdoor temperature will increase or decrease the building heat loss, the heating system must be adjusted accordingly. In order to properly control the amount of heat output it is necessary to modulate or proportion the input power to the heating elements 16 so that a variable percentage change in output heat will result for corresponding outdoor temperatures.

Referring again to FIGURE 1, there is shown an air temperature sensing element 44 which is mounted outside the building 10 in the vicinity of the outside wall 12 and the heating zone which is to be controlled. The sensing element 44 is a resistance device which changes resistance when subjected to temperature changes. A connection 46 couples the outdoor sensing element 44 to one leg of a second bridge circuit in the proportional controller 36. This second bridge circuit is coupled to the first bridge circuit containing the heat sensing element 32 and the output of both bridges is connected to the proportional amplifier. Thus, changes in outdoor temperature will unbalance the second bridge circuit and develop an amplified error signal from the proportional controller 36 which operates the power controller 38 to accordingly vary the power input to the heating elements 16. This adjusts the heat output of the heating system to more accurately match the current outdoor temperature conditions. The heat sensing element 32 is now heated by the increased heat output from the heating elements 16 and the corresponding change in resistance of the sensing element 32 continues until the first bridge circuit reaches a balanced condition at a new set level which has been determined by the resistance change of the outdoor temperature sensing element 44 corresponding to a predetermined change in the outdoor temperature.

The system can be set up for use with an air supply system such that for relatively minor changes in outdoor temperature, such as one or two degrees Fahrenheit, changes in the resistance of the outdoor sensing element 44 will be insignificant and the bridge circuits will be maintained in the original set level by the indoor sensing element 32 corresponding to a prescribed heat output. However, relatively greater changes in outdoor temperatures such as five to ten degrees Fahrenheit, will significantly change the resistance of the outdoor sensing element 44 to unbalance the second bridge circuit and to provide a proportional percentage error signal to the power controller 38 which alters the input voltage to the heating element 16. The new amount of heat output from the heating elements 16 will then act on the sensing element 32 and change the resistance thereof until the second bridge circuit is again balanced at the new set level. This results in a proportionate percentage change in output heat with changes in outdoor temperature. The system can also be utilized without an air supply system in which case the voltage supplied to the heating elements will be varied with even slight changes in outdoor temperature.

A somewhat simpler system, which may be applicable in certain desired situations, can be provided where the heat sensing element 32 is eliminated. In this arrangement the power or voltage supplied to the heating elements is varied in a direct manner with changes in the outdoor temperature as detected by the outdoor sensing element 44. Thus, the voltage supplied to the heating elements might vary from for instance 280 volts at −10 degrees outdoor temperature to zero volts at 60 degrees.

In certain situations it is desirable to vary the heat output to a particular zone in accordance with various environmental conditions to which the zone is subjected. One compensation which is desirable is to lower the amount of heat output during conditions when the zone is exposed to the sun. Referring now to FIGURE 2, there is illustrated an arrangement adaptable to the principles of the present invention so as to vary the amount of heat output also in correspondence with the solar effect on a given exposure. A solar sensing element 48 is mounted on the outside wall 12 of the building 10 at such a position that its exposure to the sun is representative of the zone which is to be controlled. In conjunction with the solar sensing element 48, there is provided a standard temperature sensing element 50 which is shielded from the direct rays of the sun 51 at all times by a shade 52.

The solar sensing element 48 and the shaded sensor 50 are connected in adjacent legs of a solar sensing bridge circuit of a compensator 54, and due to the fact that both elements are subjected to the same ambient temperature the bridge does not respond to ambient temperature effects. The output of the bridge including elements 48 and 50 therein is directly proportional to only the solar effect on the wall 12. A third sensor 44 similar to that previously described in connection with FIGURE 1 is mounted adjacent to the solar compensating sensors 48 and 50. The output of the outdoor air temperature sensing element 44 is coupled by lead 53 to one leg of the second temperature sensitive bridge circuit in the controller 36.

The solar sensitive bridge containing the solar compensating sensing elements 48 and 50 is connected in series with the first and second bridge circuits in the controller 36 by a lead 56 so as to reset the first bridge circuit in proportion to the solar effect for a given exposure and to changes in outside air temperature.

The operation of this arrangement is similar to that previously described in connection with FIGURE 1. For example, the proportional controller 36 and the corresponding bridge containing the heat sensitive element 32 is first adjusted to assure a desired amount of heat output from the heating elements 16. Due to an outside temperature decrease for instance by ten degrees Fahrenheit, the outdoor sensing element 44 changes resistance which unbalances the second bridge in the controller 36. This does not effect the balanced condition of the solar sensitive bridge in the compensator 54. However, the unbalanced position of the second bridge provides an error signal which is amplified, and through the linear power controller 38 the voltage input to the heating elements 16 is proportionately raised. By increasing the voltage input to the heating elements 16 an increased heat output is derived therefrom which is sensed by the sensing element 32 to change the resistance thereof so as to balance the bridge circuits at a new set level.

Under such conditions, if the building 10 and the particular heating zone is being subjected to a high solar load this will unbalance the solar sensitive bridge in the compensator 54 and develop a corresponding error signal which is coupled to the proportional controller 36 to operate the linear power controller so as to lower the voltage to the electric resistance elements 16.

This operation proportionately lowers the heat output which is again sensed by the sensing element 32 to establish a new set level in the bridge circuits of controller 36.

The foregoing detailed description has been given for clearness of understanding only, and no unnecessary limitations should be understood therefrom, as modifications will be obvious to those skilled in the art.

What is claimed is:
1. An electric heating system for enclosures, said heating system proportionately varying the output heat to said enclosure, and comprising:
   an electric resistance heating element for supplying variable amounts of heat to said enclosure in accordance with corresponding variable operating voltages;
   an indoor heat sensing element mounted immediately adjacent said heating element and directly sensing the actual output heat therefrom;
   first power control means including said indoor heat sensing element for controlling the operating voltage of said heating element in response to the directly sensed output heat;
   said first power control means having a preset balanced level to maintain the output heat from said heating element relatively constant at said balanced level during relatively constant environmental conditions outside of said enclosure;
   an outdoor temperature sensing element mounted outside of said enclosure for sensing the outside temperature;
   second power control means including said outdoor temperature sensing element and connected to said first power control means for unbalancing said first power control means from said balanced level to an unbalanced level in response to changes in the outside tempearture as sensed by said outdoor temperature sensing element;
   variable power means coupled to said heating element and responding to changes from the balanced level of said first power control means to proportionally vary said heating element operating voltage and the corresponding heat output of said heating element;
   said indoor heat sensing element responding to said changes in the output heat from said heating element for rebalancing said first power control means at said second level;
   and air supply means for supplying convection heating and ventilating air to said enclosure, said air supply means including thermostat means for setting the desired temperature within said enclosure and for sensing the actual indoor temperature within said enclosure, and thermostat control means responding to said sensed indoor temperature for varying the temperature of said heating and ventilating air supplied to said enclosure so as to set the final temperature within said enclosure.

2. An electric heating system as claimed in claim 1, including solar compensating means coupled to said variable power means to vary the output heat of said heating element in response to solar exposure of the portions of said enclosure heated by said heating elements.

3. An electric heating system as claimed in claim 1, wherein said second power control means maintains the original balanced level of said first control means for changes in outdoor temperature less than about five degrees Fahrenheit, and unbalances said first control means to an unbalanced level for changes in outdoor temperature greater than about five degrees Fahrenheit.

4. An electric heating system for enclosures, said heating system proportionately varying the output heat to said enclosure, and comprising:
   an electric resistance heating element for supplying variable amounts of heat to said enclosure in accordance with corresponding variable operating powers;
   an indoor heat sensing element mounted immediately adjacent said heating element and directly sensing the actual output heat therefrom;
   first power control means including said indoor heat sensing element for controlling the operating power of said heating element in response to the directly sensed output heat;
   said first power control means having a preset balanced level to maintain the output heat from said heating element relatively constant at said balanced level during relatively constant environmental conditions outside of said enclosure;
   an outdoor temperature sensing element mounted outside of said enclosure for sensing the outside temperature;
   second power control means including said outdoor temperature sensing element and connected to said first power control means for unbalancing said first power control means from said balanced level to an unbalanced level in response to changes in the outside temperature as sensed by said outdoor temperature sensing element;
   variable power means coupled to said heating element and responding to changes from the balanced level of said first power control means to proportionally vary said heating element operating power and the corresponding heat output of said heating element;
   said indoor heat sensing element responding to said changes in the output heat from said heating element for rebalancing said first power control means at said second level;
   and air supply means for supplying convection heating and ventilating air to said enclosure, said air supply means including thermostat means for setting the desired temperature within said enclosure and for sensing the actual indoor temperature within said enclosure, and thermostat control means responding to said sensed indoor temperature for varying the temperature of said heating and ventilating air supplied to said enclosure so as to set the final temperature within said enclosure.

References Cited

UNITED STATES PATENTS

| 3,060,299 | 10/1962 | Morgan | 219—494 |
| 3,188,553 | 6/1965 | Eurenius. | |
| 3,246,839 | 4/1966 | Steghart et al. | 236—91 |

BERNARD A. GILHEANY, *Primary Examiner.*

F. E. BELL, *Assistant Examiner.*

U.S. Cl. X.R.

236—091